(12) United States Patent
Kato (10) Patent No.: US 7,964,795 B2
(45) Date of Patent: Jun. 21, 2011

(54) WIRE HARNESS FIXING STRUCTURE

(75) Inventor: Hajime Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/647,196

(22) Filed: Dec. 29, 2006

(65) Prior Publication Data

US 2007/0187144 A1 Aug. 16, 2007

(30) Foreign Application Priority Data

Feb. 15, 2006 (JP) ................................ 2006-038422

(51) Int. Cl.
*H01B 7/00* (2006.01)
*H02G 3/04* (2006.01)

(52) U.S. Cl. .................................. 174/72 A; 174/68.1

(58) Field of Classification Search ............... 174/72 A, 174/68.1
See application file for complete search history.

(56) References Cited

U.S. PATENT DOCUMENTS

| | | | | | |
|---|---|---|---|---|---|
| 3,787,605 | A | * | 1/1974 | Van Gessel et al. | 174/500 |
| 4,443,031 | A | * | 4/1984 | Borsh et al. | 285/419 |
| 4,470,622 | A | * | 9/1984 | Pate et al. | 285/419 |
| 5,046,766 | A | * | 9/1991 | Lomberty et al. | 285/419 |
| 5,352,855 | A | * | 10/1994 | Potter | 174/135 |
| 5,367,126 | A | * | 11/1994 | Kikuchi | 174/71 R |
| 5,401,905 | A | * | 3/1995 | Lesser et al. | 174/99 R |
| 5,444,182 | A | * | 8/1995 | Hoshino | 439/368 |
| 5,796,041 | A | * | 8/1998 | Suzuki et al. | 174/92 |
| 6,254,042 | B1 | * | 7/2001 | Kogure et al. | 248/74.1 |
| 6,294,736 | B1 | * | 9/2001 | Takeda et al. | 174/72 A |
| 6,903,275 | B1 | * | 6/2005 | Jetton | 174/72 A |
| 6,933,439 | B2 | * | 8/2005 | Nishihara et al. | 174/481 |
| 2003/0165307 | A1 | * | 9/2003 | Liden | 385/100 |
| 2004/0144557 | A1 | * | 7/2004 | Miyazaki | 174/72 A |
| 2004/0154817 | A1 | * | 8/2004 | Sudo et al. | 174/49 |
| 2005/0045361 | A1 | * | 3/2005 | Arai et al. | 174/72 A |

FOREIGN PATENT DOCUMENTS

| | | | |
|---|---|---|---|
| JP | 60-138318 U | | 9/1985 |
| JP | 62-115724 U | | 7/1987 |
| JP | 02-034888 U | | 3/1990 |
| JP | 03159513 A | * | 7/1991 |
| JP | 08168136 A | * | 6/1996 |
| JP | 08-275343 A | | 10/1996 |
| JP | 9-135520 A | | 5/1997 |
| JP | 11069561 A | * | 3/1999 |
| JP | 2000-102155 A | | 4/2000 |
| JP | 2002-199558 A | | 7/2002 |
| JP | 2004-268803 A | | 9/2004 |

OTHER PUBLICATIONS

English Language Translation of Japanese Office Action dated Jun. 30, 2009.
Japanese Office Action dated Sep. 28, 2009.

* cited by examiner

*Primary Examiner* — Angel R Estrada
*Assistant Examiner* — David M Sinclair
(74) *Attorney, Agent, or Firm* — Sughrue Mion, PLLC (57) ABSTRACT

There is disclosed a wire harness fixing structure for fixing a wire harness to a mounting portion, the wire harness comprising wires, and a corrugated tube through which the wires pass. The corrugated tube is divided into a plurality of sections in a longitudinal direction thereof. That portion of the wires exposed at a division portion is held by a fixing device, and the fixing device is fixed to the mounting portion.

11 Claims, 7 Drawing Sheets

WIRE HARNESS FIXING STRUCTURE

BACKGROUND OF THE INVENTION

1. Field of the Invention

This invention relates to a wire harness fixing structure in which when a wire harness covered with a flexible corrugated tube for wire protection purposes is installed on a vehicle body or the like, the wire harness can be prevented from being affected by vibrations.

2. Related Art

Figure 7:
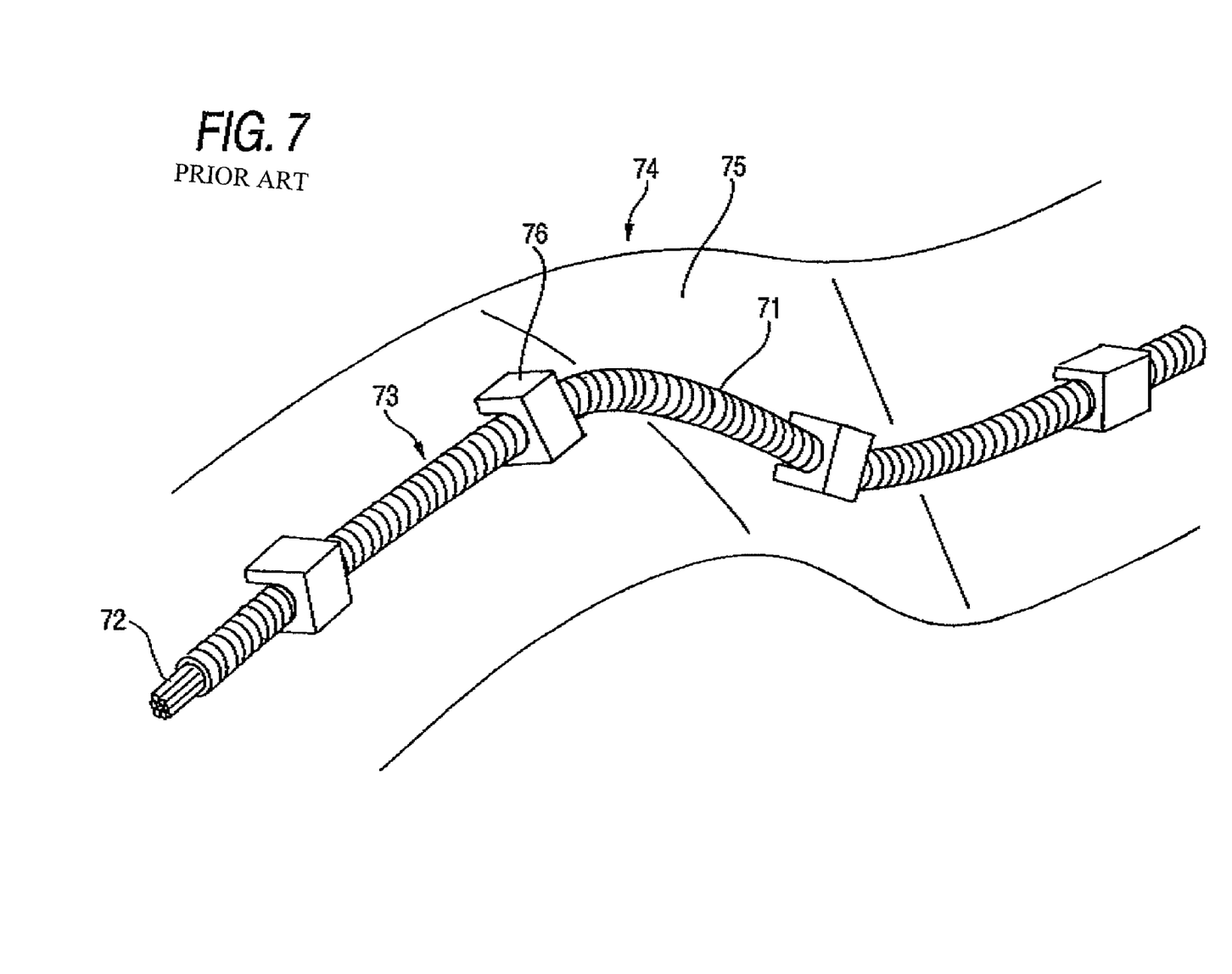
FIG. 7 is a perspective view showing a conventional wire harness fixing structure.

FIG. 7 shows a conventional wire harness structure. A corrugated tube 71 is made of a synthetic resin, and is in the form of a thin-wall cylinder, and has parallel grooves and ridges alternately arranged at equal intervals in a longitudinal direction thereof, the grooves and ridges being formed over an entire periphery of the corrugated tube. The corrugated tube 71 is highly bendable, and a plurality of wires 72 are passed through the interior of the corrugated tube 71, so that the corrugated tube 71 and the wires 72 jointly form a wire harness 73.

The corrugated tube 71 serves as a wire protection tube, and this corrugated tube 71, together with the plurality of wires 72, can be easily bent into conformity with a two- or a three-dimensionally curved panel 75 of a mounting portion 74 such as a vehicle body, and thus the corrugated tube 71 enhances the efficiency of the operation for installing the wire harness 73.

There are two types of corrugated tubes 71, and one type has a slit, while the other type has no slit. With respect to the type of corrugated tube 71 with the slit, the wires 72 can be easily passed through the corrugated tube, using the slit. With respect to the type of corrugated tube 71 having no slit, the operation for passing the wires 72 through the corrugated tube is cumbersome, but there is no fear that the slit may be opened, and besides there is no need to wind a vinyl tape around the corrugated tape.

One example of a corrugated tube fixing device (hereinafter referred to merely as "fixing device") 76 is a clamp which presses the corrugated tube 71 against the panel 75 of the mounting portion 74. The fixing devices 76 need to be provided at least at bent portions of the mounting portion 74 such as the vehicle body. A band or the like can be used as such a fixing device.

The fixing device 76 is fixed to the mounting portion 74 by an elastic retaining clip, a screw or other means. The retaining clip has a pair of elastic retaining piece portions which are inserted into a hole in the panel 75, and are retained therein. In the case of using the screw, the screw is inserted into a hole in a bracket of the fixing device 76, and is threaded into a screw hole in the panel 75, thereby fixing the fixing device to the panel 75.

The wire harness 73 is installed on and along the curved surface of the mounting portion 74 such as the vehicle body, and the corrugated tube 71 is firmly fixed to the mounting portion 74 by the plurality of fixing devices 76 spaced from one another in the longitudinal direction of the corrugated tube. As a result, the wire harness 73 is firmly fixed to the mounting portion 74, and therefore the shaking of the wire harness 73 due to vibrations developing during the travel of the vehicle, the interference of the wire harness 73 with the vehicle body (the mounting portion 74), the generation of abnormal sounds due to these phenomena, etc., are prevented.

The wires 72 within the corrugated tube 71 are protected from rain water, dirt, etc., by the corrugated tube 71, and are extended, for example, along the vehicle body (74) to a predetermined portion such as an instrument panel, a floor or a door (a hinge-type door or a slide door), and are connected to electrical equipments or auxiliary equipments on this predetermined portion through connectors. See JP-A-2002-199558 Publication, for example.

However, in the case where one end of such a wire harness covered with the corrugated tube is connected to a terminal fixed to the vehicle body, while the other end of the wire harness is connected to a terminal fixed to a portion which vibrates together with an engine, the one end portion and the other end portion of the wire harness are different in condition of vibration. Namely, the vibration of the body-side connection portion of the wire harness is small, while vibration of the engine-side connection portion of the wire harness is large.

And besides, the wire harness is not fixed within the corrugated tube, and therefore when the one end portion and the other end portion of the wire harness vibrate in different manners, respectively, the wires slide in contact with the inner surface of the corrugated tube, and are damaged by the friction, thus inviting a problem that an insulating performance of the wires are lowered.

There is the type of wire harness in which a bundle of wires are covered at its outer periphery with a metal braid for the purpose of blocking electromagnetic waves. In this case, when one end portion and the other end portion of the wire harness vibrate in different manners, respectively, the braid slides in contact with the inner surface of the corrugated tube, and is damaged by the friction, thus inviting a problem that an electromagnetic wave-blocking performance of the braid is lowered. And besides, the wires slide in contact with the inner surface of the corrugated tube through a damaged portion of the braid, and are damaged by the friction, thus inviting a problem that the insulating performance of the wires is lowered.

SUMMARY OF THE INVENTION

It is an object of this invention to solve the above problems, and more specifically to provide a wire harness fixing structure in which a wire or a braid within a corrugated tube is prevented from being damaged by vibrations, thereby preventing a performance of the wire harness from being lowered.

The above object has been achieved by the following construction.

(1) A wire harness fixing structure for fixing a wire harness to a mounting portion, wherein the wire harness comprises a wire, and a corrugated tube through which the wire passes, characterized in that the corrugated tube is divided into a plurality of sections in a longitudinal direction thereof; and that portion of the wire exposed at a division portion between the adjacent sections is held by a fixing device; and the fixing device is fixed to the mounting portion.

(2) The wire harness fixing structure of the above Paragraph (1) characterized in that the wire is covered with a braid made of metal.

(3) The wire harness fixing structure of the above Paragraph (1) or Paragraph (2) characterized in that the fixing device comprises a holder for holding the wire, and a fixing band for fastening the wire to the holder.

(4) The wire harness fixing structure of any one of the above Paragraphs (1) to (3) characterized in that the fixing device comprises a reception portion and a lid portion which cooperate with each other to hold the wire in surrounding relation thereto, and notches for gripping the wire are formed respectively in the reception portion and the lid portion.

(5) The wire harness fixing structure of any one of the above Paragraphs (1) to (4) characterized in that elastic members for gripping the wire are filled in the interior of the reception portion and the interior of the lid portion, respectively.

In the construction of the above Paragraph (1), the wire harness is fixed at the division portion of the corrugated tube, and therefore even when that portion of the wire disposed at one side of the division portion vibrates, the transmission of this vibration is interrupted at the fixed portion of the wire harness disposed at the division portion, and therefore this vibration will not be transmitted to that portion of the wire disposed at the other side of the division portion. Therefore, the portion of the wire, disposed at the other side of the division portion, and the corrugated tube are kept generally in a united condition, and the wire will not slide in contact with an inner surface of the corrugated tube, and therefore will not be damaged.

That portion of the corrugated tube disposed at the one side of the division portion (that is, the vibration generating source-side corrugated tube portion) serves as a vibration-allowing region, and this portion inevitably vibrates. Therefore, preferably, this portion is made as short as possible.

In the construction of the above Paragraph (2), the braid will not be damaged, and therefore an electromagnetic wave-blocking performance of the wire harness will not be lowered.

The wire may be a single wire or may be in the form of a bundle of wires.

In the present invention, the wire will not slide in contact with the inner surface of the corrugated tube, and therefore will not be damaged, and the insulating performance, electromagnetic wave-blocking performance, etc., of the wire harness will not be lowered, thereby ensuring a stable supply of electricity.

DETAILED DESCRIPTION OF THE PREFERRED EMBODIMENTS

A preferred embodiment of the present invention will now be described with reference to the drawings.

Figure 1:
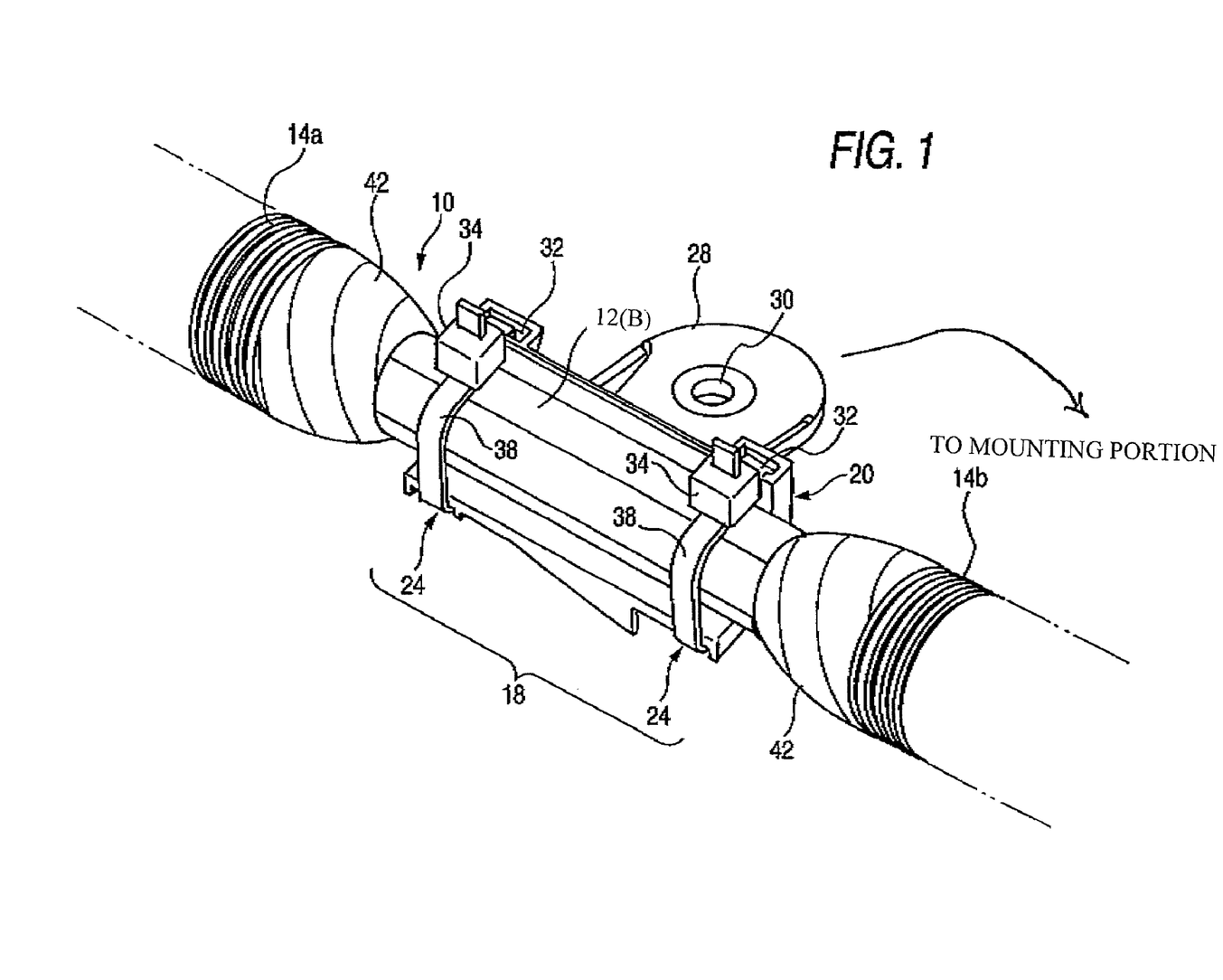
FIG. 1 is a perspective view showing a fixed condition of a wire harness used in an automobile.
Figure 2A:
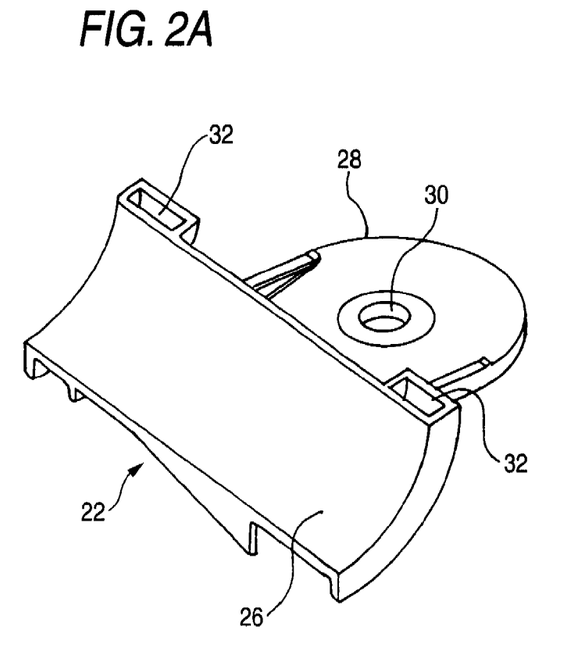
FIGS. 2A and 2B are perspective views of a fixing device for holding wires.
Figure 2B:
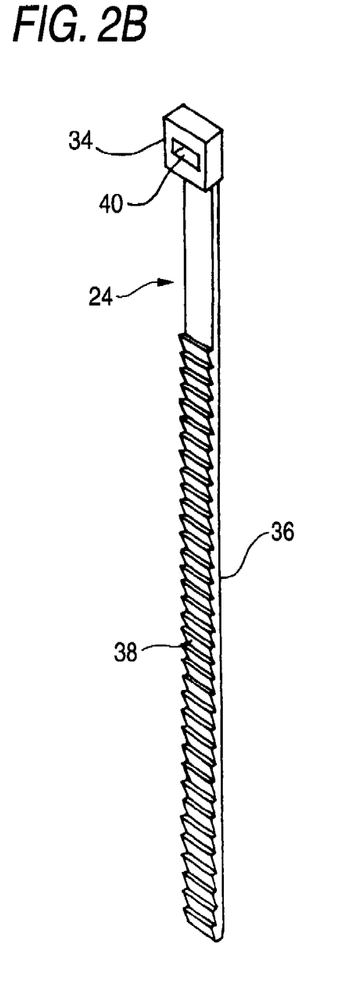
Figure 3:
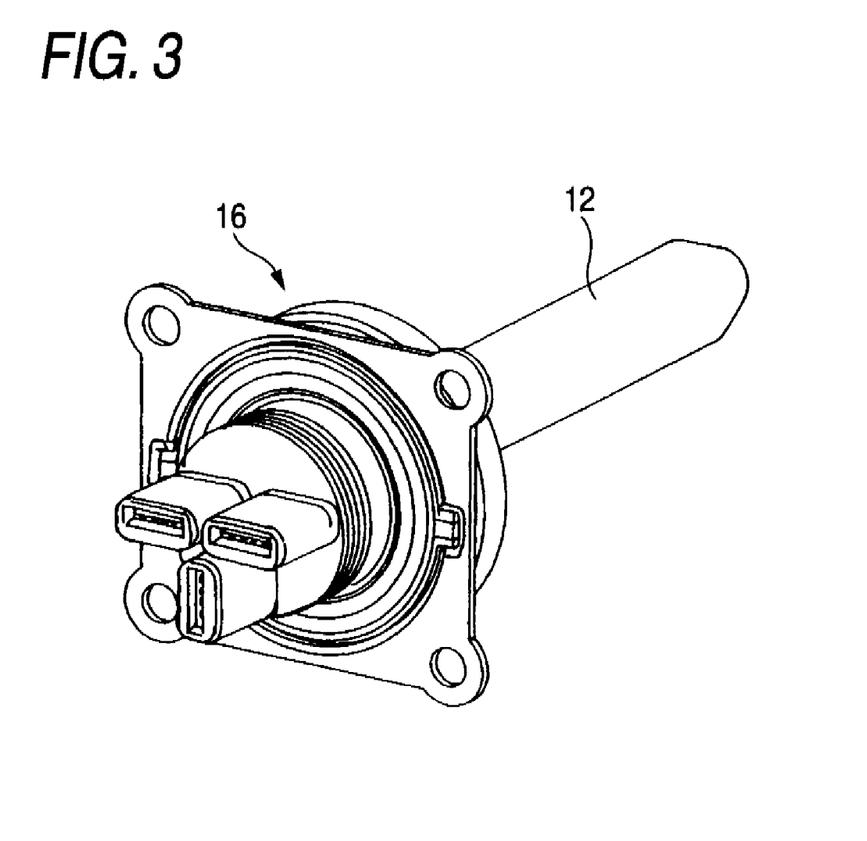
FIG. 3 is a perspective view showing the wire harness having a connector connected to its end portion.
Figure 4:
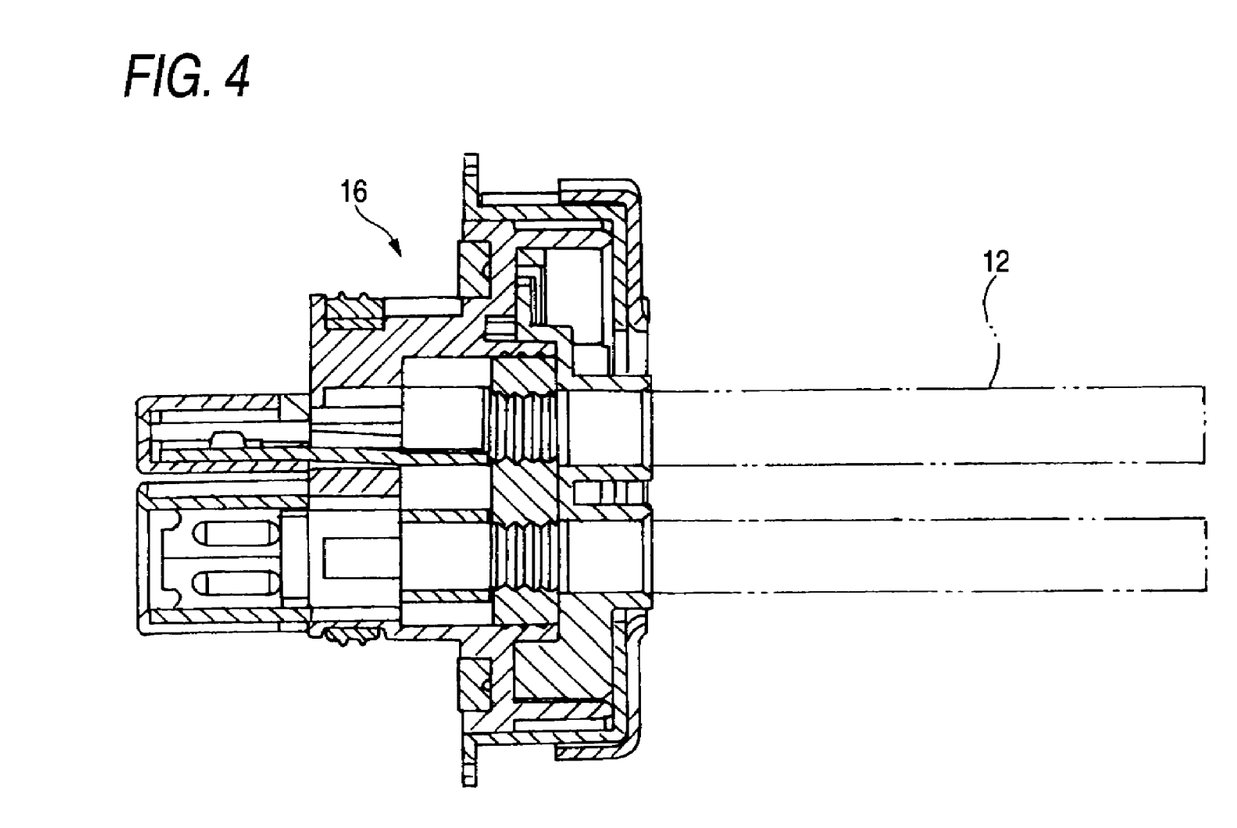
FIG. 4 is a cross-sectional view of the portion of FIG. 3.

FIG. 1 is a perspective view showing a fixed condition of a wire harness used in an automobile, FIGS. 2A and 2B are perspective views of a fixing device for holding wires, FIG. 3 is a perspective view showing the wire harness having a connector connected to its end portion, and FIG. 4 is a cross-sectional view of the portion of FIG. 3.

As shown in FIG. 1, the wire harness 10 comprises a plurality of wires 12 bundled together, and a corrugated tube (14a and 14b) (serving as a protective member) fitted on the bundle of wires 12. As shown in FIGS. 3 and 4, the connector 16 is connected to one end portion of the wire harness 10, and a similar connector (not shown) is connected to the other end portion (not shown) of the wire harness. The connector 16 is coupled, for example, to an electrical connection portion provided at a portion which vibrates together with an engine, while the other connector is coupled, for example, to an electrical connection portion of a vehicle body.

The corrugated tube (14a and 14b) is divided in a longitudinal direction thereof, and the bundle of wires 12 are exposed at a division portion 18. The division portion 18 serves as a wire fixing portion, and the bundle of wires 12 are held by the fixing device 20, and the fixing device 20 is fixed to a mounting portion such as the vehicle body.

As shown in FIGS. 2A and 2B, the fixing device 20 comprises a resin-made wire holder 22 for holding the wires 12, and resin-made fixing bands 24 for binding the wires 12 held on the wire holder 22 and for fixing the wires 12 to the wire holder 22.

The wire holder 22 includes a curved surface 26 for holding the wires 12 thereon, and a mounting piece portion 28 for fixing the wire holder 22 to the mounting portion such as the vehicle body. A mounting hole 30 is formed through the mounting piece portion 28, and is used for fixing the mounting piece potion 28 to the mounting portion. A pair of holes 32 each for the passage of the fixing band 24 therethrough are formed in the wire holder 22.

The fixing band 24 includes a base portion 34 and a strap-like portion 36 which are formed integrally with each other. A number of parallel retaining teeth 38 are formed on the strap-like portion 36, and a retaining hole 40 is formed through the base portion 34. A tongue (not shown) is formed within the retaining hole 40, and when the strap-like portion 36 is inserted into the retaining hole 40, the tongue is retainingly engaged with the retaining tooth 38 to prevent the strap-like portion 36 from being withdrawn from the retaining hole 40.

For fixing the wires 12 to the wire holder 22, the wires 12 are held on the curved surface 26, and in this condition the strap-like portion 36 of each fixing band 24 is passed through the hole 32, and then is wound around the wires 12 to tightly fasten the wires 12, and then is passed through the retaining hole 40, and is fixed to the base portion 34, thereby binding and fixing the wires 12. The wire holder 22 can be fixed to the mounting portion such as the vehicle body by fitting a projection (formed on the mounting portion) into the mounting hole 30 or by passing a screw or the like through the mounting hole 30 and a hole formed in the mounting portion.

As shown in FIG. 1, an insulative tape 42 is wound on one end portion of each of the corrugated tube portions 14a and 14b (hereinafter referred to merely as "corrugated tapes"), thereby fixing this end portion to the wires 12. Similarly, the other end portion of each of the corrugated tubes 14a and 14b is fixed to the wires by winding an insulative tape around this end portion.

When the left end portions (in FIG. 1) of the wires 12 are connected to the portion which vibrates together with the engine, the left (that is, vibration source-side) corrugated tube 14a and the left portions of the wires 12 (in FIG. 1) vibrate upon vibration of the engine. However, the wires 12 are fixed to the mounting portion by the fixing device 20, and therefore the vibration of the corrugated tube 14a and its associated portions of the wires 12 which are disposed at the left side of the fixing device 20 will not be transmitted to the corrugated tube 14b and its associated portions of the wires 12 which are disposed at the right side of the fixing device 20, so that the corrugated tube 14b and its associated portions of the wires 12 which are disposed at the right side of the fixing device 20 are kept generally in a united condition. Therefore, the wires 12 will not slide in contact with the inner surface of the corrugated tube 14b, and are prevented from damage. Thus, the left (vibration source-side) corrugated tube 14a (in FIG. 1) functions as a vibration-allowing portion.

Here, since the vibration of the engine is inevitably transmitted to the vibration-allowing portion of the wire harness 10, there is a possibility that sliding contact occurs between the corrugated tube 14a and the wires 12. Therefore, in order to reduce adverse effects of the vibration, preferably, the position of the division portion 18 (by which the corrugated tubes 14a and 14b are separated from each other), that is, the position of the fixing device 20, is determined such that the vibration source-side portion of the wire harness 10 is made as short as possible.

In the above embodiment, although the portions of the wires 12 held by the fixing device 20 are not covered with the corrugated tubes 14a and 14a, and therefore are exposed, a resin-made protector (not shown) with a slit can be fitted on the exposed portions of the wires 12 to protect these exposed portions, in which case the wires 12 are bound together by the fixing bands 24 after this protector is fitted on the wires 12.

In the above embodiment, the wire harness may be of the type in which the wires 12 are covered with a metal braid B. In the case where the wires 12 are thus covered with the braid B, the braid is exposed at the division portion 18, and are not covered with the corrugated tubes 14a and 14b at the division portion 18. Therefore, preferably, a resin-made protector (not shown with a slit is fitted on the exposed portion of the braid B to protect the same.

Next, a second embodiment of a fixing device of the invention will be described.

Figure 5:
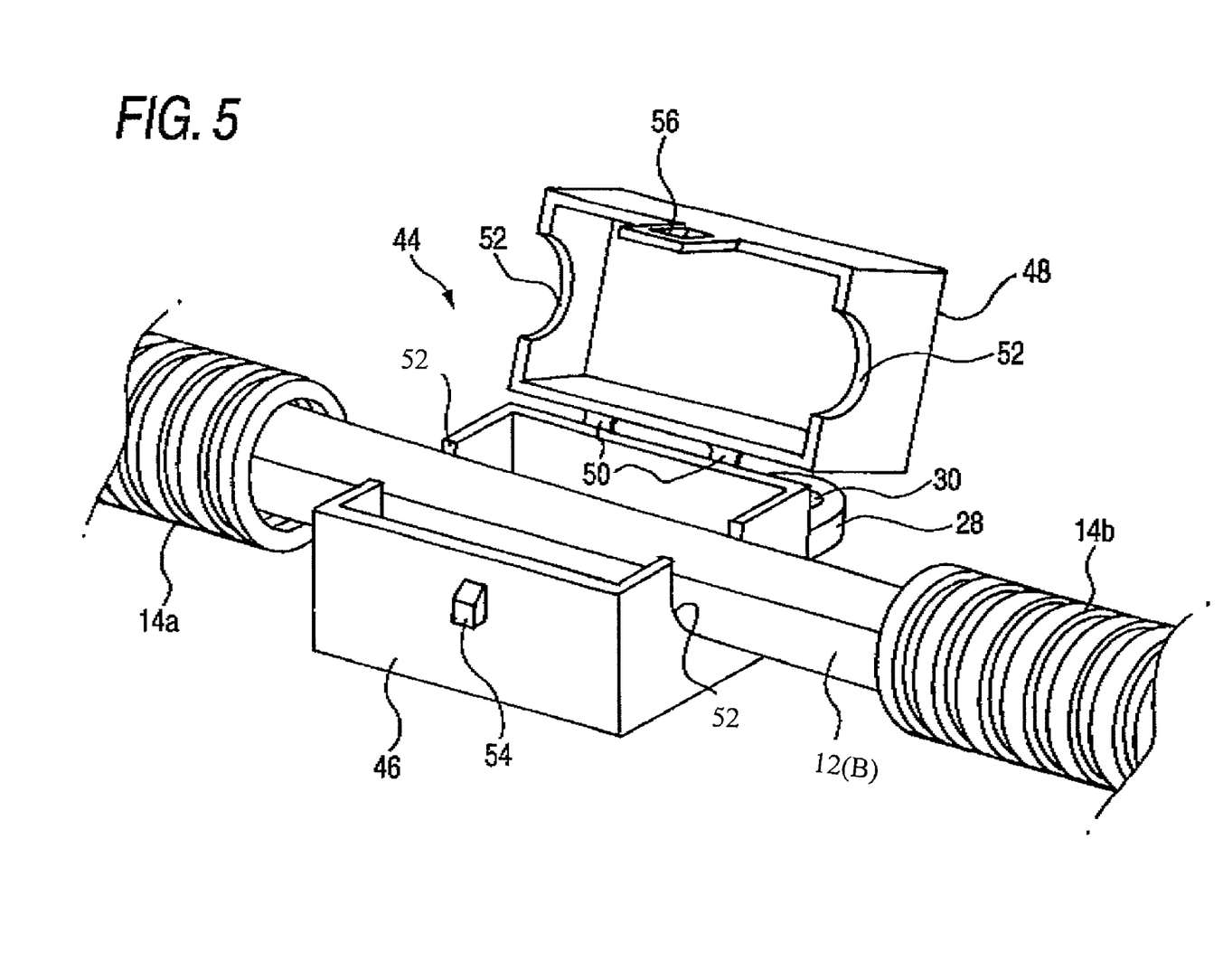
FIG. 5 is a perspective view showing a second embodiment of a fixing device of the invention.

As shown in FIG. 5, the fixing device 44 of the second embodiment is made of a resin, and comprises a hollow box which can be pivotally opened and closed at one side thereof. More specifically, the fixing device 44 comprises a reception portion 46 and a lid portion 48 which are integrally connected together by hinge portions 50 formed at opposed edge portions of the reception portion 46 and lid portion 48. Two semi-circular notches 52 for the passage of wires 12 therethrough are formed in the reception portion 46, and similarly two semi-circular notches 52 are formed in the lid portion 48. A retaining claw 54 is formed at the reception portion 46, and a retaining frame-like piece portion 56 is formed at the lid portion 48. When the lid portion 48 is closed, the retaining frame-like piece portion 56 is retainingly engaged with the retaining claw 54, so that the lid portion 48 is held in its closed condition.

When the lid portion 48 is closed, each mating pair of notches 52 jointly form a hole having a diameter slightly smaller than an outer diameter of the bundle of wires 12, and with this construction the wires 12 can be gripped and fixed by the notches 52. Although not shown in the drawings, insulative tapes 42 are wound respectively on end portions of corrugated tubes 14a and 14b, thereby fixing these corrugated tubes to the wires 12.

The fixing device 44 holding the wires 12 is fixed to the mounting portion, utilizing a mounting hole 30 formed through a mounting piece portion 28. The fixing device 44 covers exposed portions of the wires 12 which are not covered with the corrugated tubes 14a and 14b, and therefore the fixing device 44 functions also as a protector.

The wires 12 are fixed to the mounting portion by the fixing device 44, and therefore the vibration of the corrugated tube 14a and its associated portions of the wires 12 which are disposed at the left side of the fixing device 44 will not be transmitted to the corrugated tube 14b and its associated portions of the wires 12 which are disposed at the right side of the fixing device 44, and therefore the corrugated tube 14b and its associated portions of the wires 12 which are disposed at the right side of the fixing device 44 are kept generally in a united condition. Therefore, the wires 12 will not slide in contact with the inner surface of the corrugated tube 14b, and are prevented from damage.

Next, a third embodiment of a fixing device 60 of the invention will be described.

Figure 6:
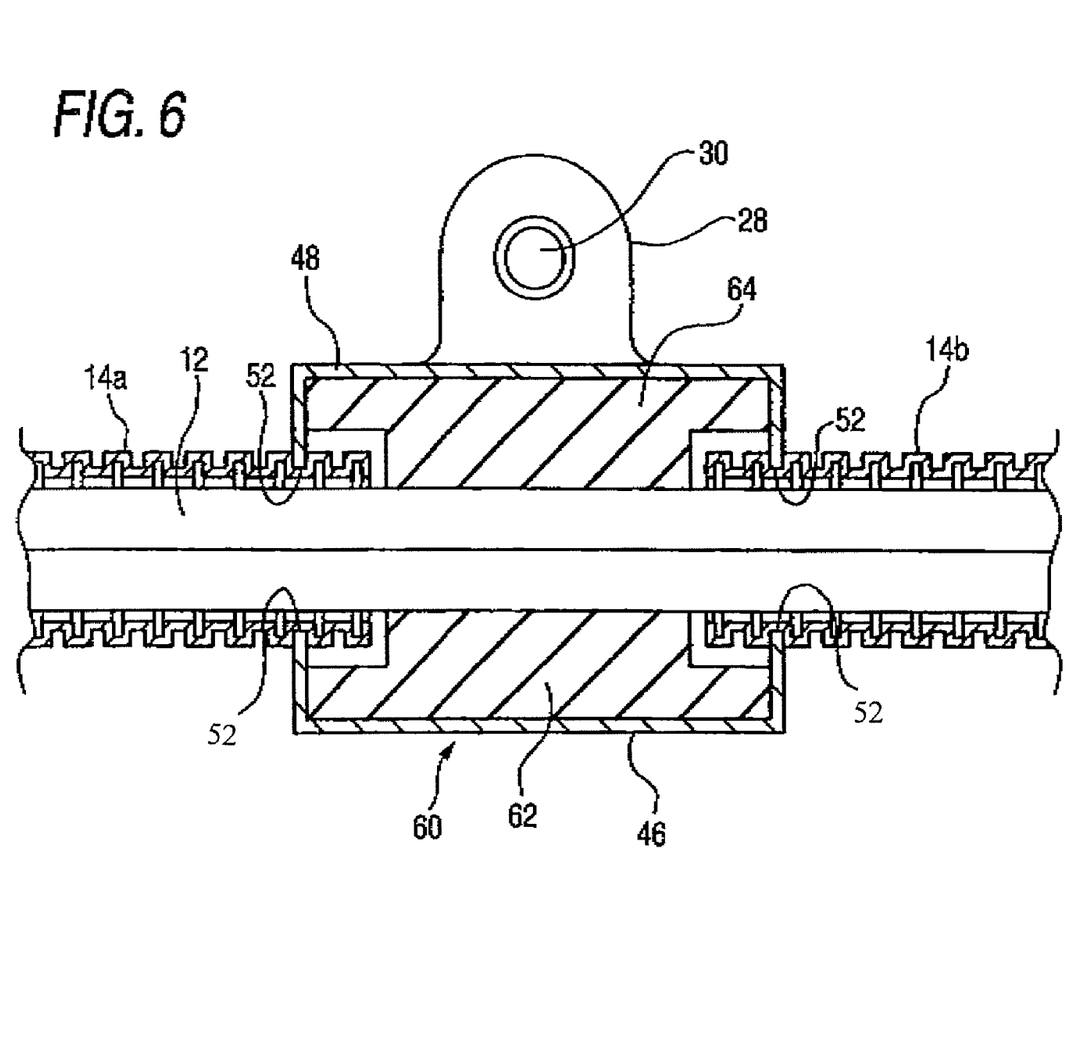
FIG. 6 is a cross-sectional view showing a third embodiment of a fixing device of the invention.

As shown in FIG. 6, the fixing device 60 of the third embodiment is generally similar in construction to the fixing device of FIG. 5, and differs from the fixing device of FIG. 5 in that elastic members 62 and 64 made of an elastic material such as rubber are filled respectively in the interior of a reception portion 46 and the interior of a lid portion 48 and that a diameter of a hole formed by each mating pair of notches 52 is so determined that a peripheral edge portion of this hole can be fitted in one of peripheral grooves formed in an outer peripheral surface of a corrugated tube 14a, 14b.

The elastic members 62 and 64 are thus filled in the reception portion 46 and the lid portion 48, respectively, and therefore when the lid portion 48 is closed, wires 12 are pressed from upper and lower sides by the elastic members 62 and 64, and are gripped and fixed by these elastic members 62 and 64. And besides, edge portions of each mating pair of notches 52 formed respectively in the reception portion 46 and the lid portion 48 are fitted in the peripheral groove in the corrugated tube 14a, 14b, so that opposed end portions of the corrugated tubes 14a and 14b are fixed to the fixing device 60. Thus, the corrugated tubes 14a and 14b are directly fixed to the fixing device 60, and therefore it is not necessary to fix the wires 12, using an insulative tape. Furthermore, as in the second embodiment, the fixing device 60 covers exposed portions of the wires 12 which are not covered with the corrugated tubes 14a and 14b, and therefore the fixing device functions also as a protector.

The wires 12 are fixed to the mounting portion by the fixing device 60, and therefore the vibration of the corrugated tube 14a and its associated portions of the wires 12 which are disposed at the left side of the fixing device 60 will not be transmitted to the corrugated tube 14b and its associated portions of the wires 12 which are disposed at the right side of the fixing device 60, and therefore the corrugated tube 14b and its associated portions of the wires 12 which are disposed at the right side of the fixing device 60 are kept generally in a united condition. Therefore, the wires 12 will not slide in contact with the inner surface of the corrugated tube 14b, and are prevented from damage.

In the above embodiments, although the wire harness 10 comprises the plurality of wires 12 passed through the corrugated tubes 14a and 14b, the wire harness may comprise a single wire 12 passed through the corrugated tubes 14a and 14b. The wire harness 10 may include a braid fitted on the wires 12.

What is claimed is:

1. A wire harness fixing structure for fixing a wire harness to a mounting portion, comprising:
   a wire; and
   a corrugated tube through which the wire passes;
   wherein said corrugated tube is divided into a plurality of sections in a longitudinal direction thereof;
   a part of said wire exposed at a division portion between the adjacent sections is held by a fixing device; and
   said fixing device is fixed to the mounting portion;
   wherein the fixing device comprises a holder having an arc shape that holds only the wire exposed at the division portion, and a fixing band that binds the wires held on the holder, and a pair of holes provided at opposite ends of the holder in the longitudinal direction through which the fixing band is inserted.

2. A wire harness fixing structure according to claim 1, wherein said wire is covered with a braid made of metal.

3. A wire harness fixing structure according to claim 1, wherein a first portion of the wire extends longitudinally from an end of a first section of the plurality of sections;
a second portion of the wire extends longitudinally from an end of a second section of the plurality of sections; and
a first band fastens the wire to the fixing device at the first portion of the wire and a second band fastens the wire to the fixing device at the second portion of the wire.

4. A wire harness fixing structure according to claim 3, wherein a mounting piece portion that fixes the fixing device to the mounting portion is disposed between said first band and said second band.

5. A wire harness fixing structure according to claim 1, further comprising an insulative tape wound on an end portion of the corrugated tube thereby fixing the end portion to the wire.

6. A wire harness fixing method for fixing a wire harness including a wire and a corrugated tube through which the wire passes to a mounting portion, comprising the steps of:
dividing said corrugated tube into a plurality of sections in a longitudinal direction thereof to expose a part of said wire at a division portion between the adjacent sections;
holding said wire at said division portion by a fixing device comprising a holder having an arc shape that holds the wire, and a fixing band that binds the wires exposed at the division portion and held on the holder, and a pair of holes provided at opposite ends of the holder in the longitudinal direction through which the fixing band is inserted; and
fixing said fixing device to the mounting portion.

7. A wire harness fixing method according to claim 6, wherein an insulative tape is wound on an end portion of the corrugated tube thereby fixing the end portion to the wire.

8. A wire harness fixing structure for fixing a wire harness to a mounting portion, comprising:
a wire covered with a braid made of metal; and
a corrugated tube through which the wire passes;
wherein said corrugated tube is divided into a plurality of sections in a longitudinal direction thereof;
a part of said wire exposed at a divisional portion between the adjacent sections is held by a fixing device; and
said fixing device is fixed to the mounting portion;
wherein said fixing device comprises a holder having an arc shape that holds the wire, and a fixing band that binds the wires exposed at the division portion and held on the holder, and a pair of holes provided at opposite ends of the holder in the longitudinal direction through which the fixing band is inserted.

9. A wire harness fixing structure according to claim 8, further comprising an insulative tape wound on an and portion of the corrugated tube thereby fixing the end portion to the wire.

10. A wire harness fixing structure for fixing a wire harness to a mounting portion, comprising:
a wire; and
a corrugated tube through which the wire passes;
wherein said corrugated tube is divided into a plurality of sections in a longitudinal direction thereof;
a part of said wire exposed at a division portion between the adjacent sections is held by a fixing device; and
said fixing device is fixed to the mounting portion;
wherein said fixing device comprises a holder having an arc shape that holds the wire, and a fixing band that binds the wires exposed at the division portion and held on the holder, and a pair of holes provided at opposite ends of the holder in the longitudinal direction through which the fixing band is inserted; wherein
the holder comprises a mounting portion that fixes the holder to the mounting portion.

11. A wire harness fixing structure according to claim 10, further comprising an insulative tape wound on an end portion of the corrugated tube thereby fixing the end portion to the wire.

* * * * *